United States Patent
Trogisch et al.

(10) Patent No.: US 6,796,851 B2
(45) Date of Patent: Sep. 28, 2004

(54) ELECTRICAL DEVICE HAVING A WALL MADE OF PLASTIC AND COMPRISING AT LEAST ONE FLEXIBLE CONDUCTOR AND METHOD FOR MANUFACTURING SUCH AN ELECTRICAL DEVICE

(75) Inventors: Guenter Trogisch, Seeheim-Jugenheim (DE); Peter Schaefer, Darmstadt-Eberstadt (DE); Stefan Ploetz, Iserlohn (DE); Martin Quarder, Minden (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/216,112

(22) Filed: Aug. 9, 2002

(65) Prior Publication Data

US 2003/0045179 A1 Mar. 6, 2003

(30) Foreign Application Priority Data

Aug. 10, 2001 (DE) .......................................... 101 39 577

(51) Int. Cl.⁷ ................................................ H01R 9/22
(52) U.S. Cl. ......................................... 439/722; 174/59
(58) Field of Search ............................. 439/66, 67, 91, 439/722; 174/59, 60

(56) References Cited

U.S. PATENT DOCUMENTS

| | | | | |
|---|---|---|---|---|
| 3,851,294 A | * | 11/1974 | Palazetti et al. | 439/272 |
| 3,924,915 A | * | 12/1975 | Conrad | 439/66 |
| 3,934,959 A | * | 1/1976 | Gilissen | 439/77 |
| 4,142,226 A | * | 2/1979 | Mears | 361/681 |
| 4,505,529 A | * | 3/1985 | Barkus | 439/82 |
| 4,623,766 A | * | 11/1986 | Utagawa et al. | 200/85 R |
| 4,897,054 A | * | 1/1990 | Gilissen et al. | 439/631 |
| 5,061,205 A | * | 10/1991 | Toramoto | 439/493 |
| 5,147,208 A | * | 9/1992 | Bachler | 439/67 |
| 5,273,440 A | * | 12/1993 | Ashman et al. | 439/71 |
| 5,427,535 A | * | 6/1995 | Sinclair | 439/66 |
| 5,429,510 A | * | 7/1995 | Barraclough et al. | 439/59 |
| 6,002,168 A | * | 12/1999 | Bellaar et al. | 257/696 |
| 6,024,580 A | * | 2/2000 | Dangler et al. | 439/67 |
| 6,155,844 A | * | 12/2000 | Semmeling et al. | 439/65 |
| 6,439,894 B1 | * | 8/2002 | Li | 439/66 |
| 6,521,830 B1 | | 2/2003 | Platz | 174/50 |
| 6,573,447 B2 | * | 6/2003 | Trogisch et al. | 174/52.1 |
| 6,595,796 B1 | * | 7/2003 | Koegel et al. | 439/495 |

FOREIGN PATENT DOCUMENTS

| | | |
|---|---|---|
| DE | 19609253 | 9/1997 |
| DE | 19810428 | 9/1999 |
| DE | 19944383 | 4/2001 |

* cited by examiner

Primary Examiner—Tho D. Ta
Assistant Examiner—Larisa Tsukerman
(74) Attorney, Agent, or Firm—Davidson, Davidson & Kappel, LLC

(57) ABSTRACT

An electrical device has at least one flexible conductor (2) which features an electrically insulating embedding (3) and which is embedded in the wall and has a plurality of electrical contact areas (4), the embedding (3) being removed from the contact areas (4) on the side of the wall (4) facing the surface, the contact areas (4) bounding the surface of the wall. Moreover, the present invention relates to a method for manufacturing such an electrical device (1).

19 Claims, 2 Drawing Sheets

ELECTRICAL DEVICE HAVING A WALL MADE OF PLASTIC AND COMPRISING AT LEAST ONE FLEXIBLE CONDUCTOR AND METHOD FOR MANUFACTURING SUCH AN ELECTRICAL DEVICE

Priority to German Patent Application No. 10139577.9, filed Aug. 10, 2001 and hereby incorporated by reference herein, is claimed.

BACKGROUND OF THE INVENTION

The present invention relates to an electrical device including at least one flexible conductor and to a method for manufacturing such an electrical device.

Flexible conductors, which are used, in particular, as electrical current conductors or data conductors, are employed for different applications. Apart from so-called "bare conductors", which do not feature an outer insulation layer, usual conductors are, in particular, conductors having an insulating layer. Regardless of this, the conductor can be provided on the outer surface with a flexible or a rigid layer, for example, a plastic sheathing, which serves, in particular, as a protection against mechanical stress.

German Patent Document No. 196 09 253 describes a method for injection molding of plastic parts featuring an electrical conductor which is molded around in the insulating plastic part and can be designed, for example, to be flexible. The electrical conductor features an electrical contact point only at the ends. In this method, a bare conductor is inserted into the mold cavity of an open mold with a certain part of its length and there mechanically pre-fixed prior to the start of the injection process. In this design approach, moreover, additional fixing points, so-called "changing fixing points", are used. This design approach is only suitable for electrical conductors which must be guaranteed to be completely embedded. The electrical conductor features an electrical contact only at its ends.

SUMMARY OF THE INVENTION

The design approach identified in German Patent Document No. 196 09 253 fails in application cases where only a partial embedding is required, in particular, where a locally defined omission of the embedding is required.

An object of the present invention is to provide an electrical device which has at least one flexible conductor featuring an electrically insulating embedding and an arbitrary number of electrical contact areas as well as to provide an inexpensive method for manufacturing such a device.

This objective may be achieved in that the embedding is removed from the contact areas on the side of the wall facing the surface and in that the contact areas bound the surface of the wall.

Along the lines of the present invention, contact areas are usual contact points located between electrical current and/or data conductors and secondary electrical components or elements, such as a semiconductor component, a sensor, a transducer, a switch or a device connector, in particular, for the purpose of electrical current and/or data transmission.

In this context, the physical connection of these parts is accomplished in a usual manner so that, in particular, an electrical current and/or data transmission is ensured between these parts.

An advantageous embodiment of the present invention is geared to providing at least one contact area which projects above the surface level of the adjacent wall. This arrangement of the contact area allows the device according to the present invention to be manufactured in a particularly economical manner since the flexible conductor is pressed into a recess in the interior space of the mold prior to introducing the plastic, which minimizes the effort for fixing in position the flexible conductor subsequently.

The aforementioned arrangement is particularly expedient if the device according to the present invention is an electrical device in which a plurality of contact areas are regularly arranged on the outer surface of the housing such as the contact areas for the keypad of a telephone.

Moreover, it is preferred for the wall to have a rigid and dimensionally stable design. This design ensures high mechanical load capability of the device.

The plastic which is preferably used as the base material for the embedding within the scope of the present invention has regularly electrically insulating properties. A plastic which features this property secondarily or not at all is claimed alternatively. Moreover, a plastic is preferred which is machinable after the injection process, a foamed plastic being, in principle, also usable within the scope of the present invention.

Moreover, the object of the present invention may be achieved by a method for manufacturing an electrical device according to the present invention, in which a flexible conductor is inserted into the mold cavity of an open mold and mechanically fixed in position prior to the start of the injection process and, upon closure, the remaining free space of the mold cavity is filled with liquid plastic after which the plastic solidifies, the mold cavity is opened and the device is removed, the conductor being pressed together with the inner wall of the mold cavity in a sealing and immovable manner only in the region of contact areas and, at the remaining locations, being held at a distance from the inner wall.

To achieve the object according to the present invention the flexible conductor should be pressed against the inner wall of the mold at the intended locations of the corresponding contact areas in as sharply contoured and impervious a manner as possible with regard to ingress of liquid plastic and/or other media during injection molding or of foamable plastic and/or other media during foaming. In this context, according to the present invention, the mechanical pre-fixing is designed such that the above described pressing takes place at least until the plastic has solidified in a dimensionally stable manner. The positioning, i.e., in particular, the holding of the flexible conductor in the desired position and/or the secure fixing in this position can be accomplished through means in a permanent, temporary or alternating manner at least while the plastic is introduced into the remaining interior space of the mold in a manner known per se.

It is preferred for at least a part of the pressing means to be mechanical pressing means. Further pressing means along the lines of the present invention are hydraulic means such as hydraulic pressure cylinders but also injection nozzles or injection nozzle systems for introducing the liquid plastic and/or other media as, for example, compressed air into the interior space of the mold. It is particularly expedient to use the mass and/or media flow introduced via the nozzles as a means along the lines described above.

Further pressing means according to the present invention are physical fields such as magnetic fields which, at least temporarily, cause or assist the flexible conductor to be pressed against the inner side of the mold. Alternatively, the desired pressing can be accomplished by temporarily applying negative pressure. The above enumeration of means is not to be regarded as conclusive.

BRIEF DESCRIPTION OF THE DRAWING

In the following, exemplary embodiments of the present invention will be explained in greater detail with reference to the drawings.

DETAILED DESCRIPTION

Figure 1:
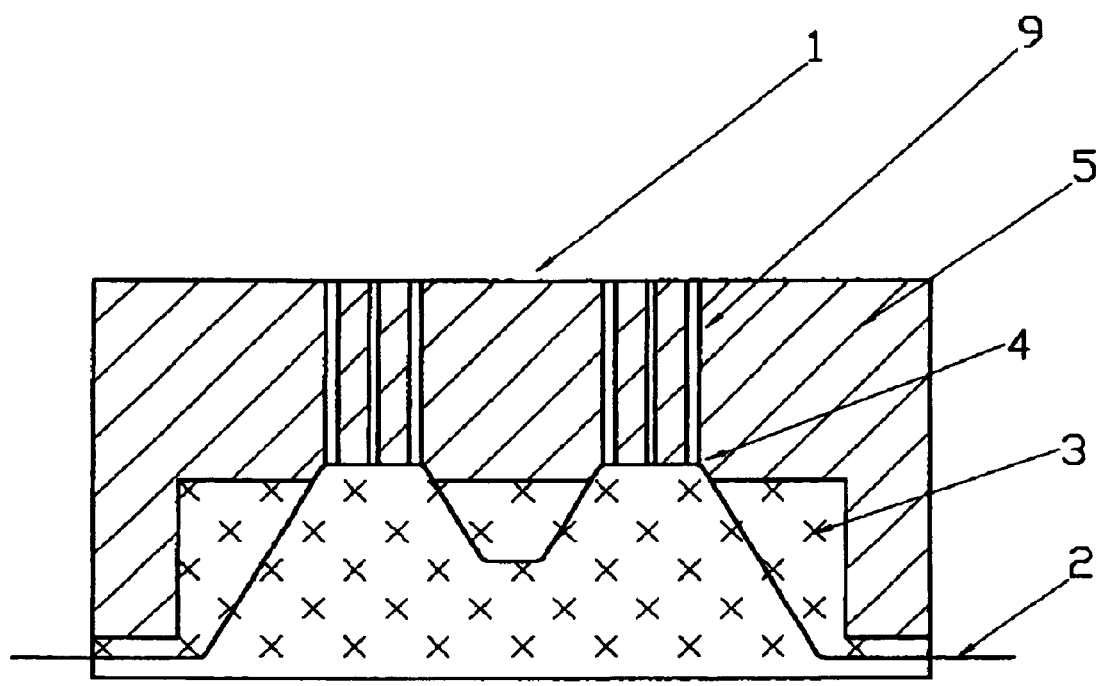
FIG. 1 shows the schematic lateral view of an electrical device as well as a schematic partial view of an open mold.

FIG. 1 shows an electrical device 1 in a mold 5, the electrical device 1 including at least one flexible electrical conductor 2 which is partially embedded into a thermoplastic material and fixed in its form by an embedding 3. This electrical device 1 has two electrical contact areas 4 which are formed by parts of flexible electrical conductor 2.

Flexible electrical conductor 2 is surrounded by embedding 3 only outside of contact areas 4. Conductor 2 is designed as a so-called bare conductor which can be used to electroconductively interconnect electrical components such as a key element of a keypad of a telephone in known manner. In the region of electrical contact areas 4, these contact areas 4 project above the surface level of adjacent embedding 3. In the FIG. 1 embodiment, embedding 3 defines the entirety of a wall for the electrical conductor 2. Two recesses corresponding to the shape of contact areas 4 are arranged in the interior space in mold 5. At each of these two recesses, three channels 9 are arranged in mold 5 for applying a vacuum, which is schematically shown FIG. 1. In the industrial production, this electrical device 1 is manufactured by the following process steps: A flexible electrical conductor 2 is inserted into the mold cavity of an open mold 5 of an injection mold and pre-fixed by usual means, in particular, holding means. Subsequently, mold 5 is closed and the part of flexible electrical conductor 2 that features the contact areas 4 is pressed against the inner wall of mold 5 using mechanical means, for example, mechanical pressing means. At the same time and/or subsequently, a vacuum is applied via channels 9 to contact areas 4, which partially already lie against the inner wall of mold 5, as a result of which it is then achieved and ensured that the two electrical contact areas 4 are pressed against the inner wall of mold 5 in a sealing manner at least while the liquid thermoplastic material is introduced into the remaining mold cavity.

After the remaining interior space of the mold cavity is completely filled with plastic, mold 5 is opened after the plastic has solidified in a dimensionally stable manner and the electrical device 1 is removed from the injection mold. The individual process steps mentioned above can be modified in usual manner on the basis of the known injection molding technology.

Figure 2:
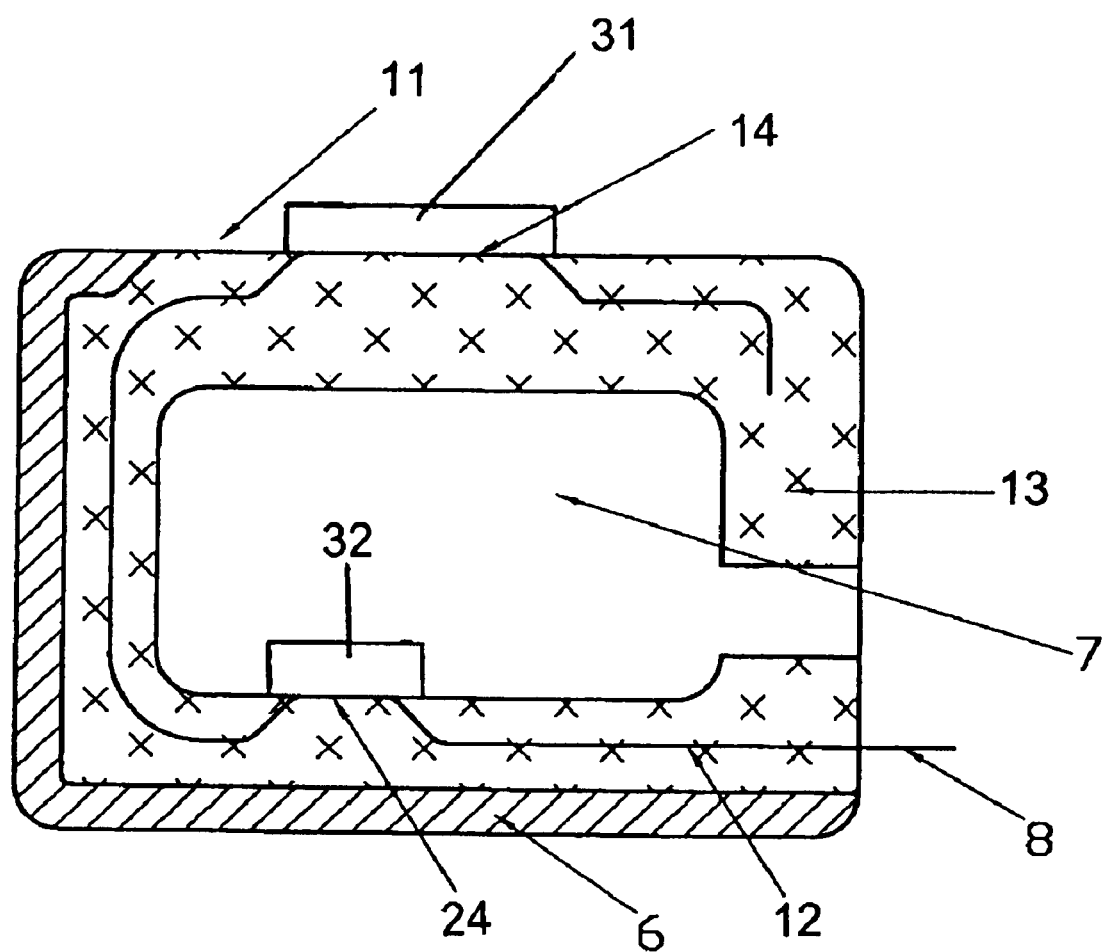
FIG. 2 depicts the schematic lateral view of an electrical device featuring a cavity.

FIG. 2 depicts an electrical device 11 according to the present invention. This device 11 features a cavity 7 which is at least partially surrounded by an outer wall 6 and an embedding 13, embedding 13 and outer wall 6 defining the wall for a flexible conductor 12. Flexible conductor 12 is arranged within electrically insulating embedding 13 except in the region of contact areas 14, 24. Embedding 13 is composed of a thermoplastic or thermosetting plastic which can be foamed or injected.

Projecting tail 8 can be provided with an electrically conducting connector or the like.

The electrical device 11 has two electrical contact areas 14, 24 which are arranged on flexible electrical conductor 12 in the region of both surfaces of the wall 6, 13 that is, on the outside and toward cavity 7, respectively. In the region of electrical contact areas 14, 24, flexible electrical conductor 12 does not feature an embedding 13 of plastic. Contact areas 14, 24 are used for electrical connection to schematically-shown electrical components 31, 32, respectively, such as semiconductor components, which are electrically interconnected via conductor 12. The surface level of electrical contact areas 14, 24 borders the adjacent surfaces of embedding 13 in a flush manner. The selected arrangement of contact areas 14, 24 makes it possible for a component located in cavity 7 to be electrically connected to a second component via conductor 12.

"Bounding" as defined herein means delimiting or defining a boundary. "Wall" as defined herein may include coatings, sheathings and casings, for example.

What is claimed is:

1. An electrical device having a wall made of plastic comprising:

a wall including an electrically insulating embedding material, the wall having a side with a wall surface, the wall defining a cavity and surrounding the cavity at least partially;

at least one flexible conductor embedded in the wall and having a plurality of electrical contact areas; and a first component located in the cavity and electrically connected to a second component via the conductor, the electrical contact areas each having a surface facing away from the side of the wall, the surface being free of the embedding material, the electrical contact areas each having another surface bounding a portion of the wall surface.

2. The device as recited in claim 1 wherein a first contact area of the plurality of contact areas projects above a surface level of the wall surface adjacent to the first contact area.

3. The device as recited in claim 1 wherein a first contact area of the plurality of contact areas is flush with the wall surface adjacent to the first contact area.

4. The device as recited in claim 1 wherein the wall has a second wall surface and wherein a first contact area of the plurality of contact areas is provided at the wall surface and a second contact area of the plurality of contact areas is provided at the second wall surface.

5. The device as recited in claim 1 wherein the conductor extends beyond the wall surface with at least one tail.

6. The device as recited in claim 1 wherein the wall is rigid and dimensionally stable.

7. The device as recited in claim 1 wherein the wall is electrically insulating.

8. The device as recited in claim 1 wherein the wall includes a foamed and/or injection-molded plastic.

9. The device as recited in claim 1 wherein the first and second components each include at least one of a semiconductor component, a sensor, a transducer, a switch and a device connector connected to the contact areas.

10. An electrical device having a wall made of plastic comprising:

a wall including an electrically insulating embedding material, the wall having a side with a wall surface and a second wall with a second wall surface; and at least one flexible conductor embedded in the wall and having a plurality of electrical contact areas, wherein a first contact area of the plurality of electrical contact areas is disposed at the wall surface and has a contact surface free of the embedding material facing away from the side of the wall, the first contact area having another surface bounding a portion of the wall surface, and wherein a second contact area of the plurality of electrical contact areas has a contact surface free of the embedding material and facing away from the second side of the wall, the second contact area having another surface bounding a portion of the second wall surface.

11. The device as recited in claim 10 wherein the first contact area of the plurality of contact areas projects above a surface level of the wall surface adjacent to the first contact area.

12. The device as recited in claim 10 wherein the first contact area of the plurality of contact areas is flush with the wall surface adjacent to the first contact area.

13. The device as recited in claim 10 wherein the conductor extends beyond the wall surface with at least one tail.

14. The device as recited in claim 10 wherein the wall defines a cavity and surrounds the cavity at least partially.

15. The device as recited in claim 14, further comprising a first component located in the cavity and electrically connected to a second component via the conductor.

16. The device as recited in claim 10 wherein the wall is rigid and dimensionally stable.

17. The device as recited in claim 10 wherein the wall is electrically insulating.

18. The device as recited in claim 10 wherein the wall includes a foamed and/or injection-molded plastic.

19. The device as recited in claim 10, further comprising at least one of a semiconductor component, a sensor, a transducer, a switch and a device connector connected to the contact areas.

* * * * *